(12) United States Patent
Motohashi et al.

(10) Patent No.: US 9,954,328 B2
(45) Date of Patent: Apr. 24, 2018

(54) CARD HOLDING MEMBER WITH SEALING FEATURE AND CARD CONNECTOR SET

(71) Applicant: Molex, LLC, Lisle, IL (US)

(72) Inventors: Nobumasa Motohashi, Yamato (JP); Akihiro Shimotsu, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/375,384

(22) Filed: Dec. 12, 2016

(65) Prior Publication Data

US 2017/0179659 A1   Jun. 22, 2017

(51) Int. Cl.
| | | |
|---|---|---|
| *H01R 12/70* | (2011.01) | |
| *H01R 27/00* | (2006.01) | |
| *H01R 12/72* | (2011.01) | |
| *H04B 1/3816* | (2015.01) | |

(52) U.S. Cl.
CPC ........... *H01R 27/00* (2013.01); *H01R 12/721* (2013.01); *H04B 1/3816* (2013.01)

(58) Field of Classification Search
CPC .............................. G05K 7/006; G06K 3/0831
USPC ................ 439/483, 928.1, 64, 946; 235/492
See application file for complete search history.

(56) References Cited

U.S. PATENT DOCUMENTS

| | | | | |
|---|---|---|---|---|
| 4,179,178 A * | 12/1979 | Bachman | ........... | H01R 13/6485 200/51.1 |
| 4,840,570 A * | 6/1989 | Mann, Jr. | ............. | H05K 7/1409 361/787 |
| 5,315,478 A * | 5/1994 | Cadwell | ................ | G06F 1/1613 361/679.32 |
| 5,519,571 A * | 5/1996 | Shieh | ...................... | G06F 1/184 361/679.37 |
| 5,563,400 A * | 10/1996 | Le Roux | .............. | G06K 19/072 235/486 |
| 5,655,917 A * | 8/1997 | Kaneshige | ............. | G06K 13/08 439/155 |
| 6,028,771 A * | 2/2000 | Wong | ................... | H05K 5/0013 361/704 |
| 6,035,216 A * | 3/2000 | Cheng | .................. | H04B 1/3816 235/475 |
| 6,050,848 A * | 4/2000 | Yao | ........................ | H01R 31/06 439/483 |
| 6,097,605 A * | 8/2000 | Klatt | ....................... | G06F 1/183 361/737 |

(Continued)

FOREIGN PATENT DOCUMENTS

JP   08-335255 A   12/1996

*Primary Examiner* — Neil Abrams
(74) *Attorney, Agent, or Firm* — James A. O'Malley

(57) ABSTRACT

A card holding member able to be inserted into a card connector via an insertion slot in an outer member and able to hold a card equipped with terminal members, the card holding member comprising a card accommodating portion able to accommodate the card, a connecting base portion connected to the card accommodating portion, a movable sleeve mounted on the connecting base portion slidably in the insertion and ejection directions of the card holding member, a first sealing member forming a seal between the connecting base portion and the movable sleeve, and a second sealing member forming a seal between the insertion slot and the movable sleeve. The use of the two sealing members helps to absorb displacement of the card holding member in case of misalignment between the card connector and the insertion slot.

6 Claims, 18 Drawing Sheets

(56) References Cited

U.S. PATENT DOCUMENTS

| | | | | |
|---|---|---|---|---|
| 6,109,939 A * | 8/2000 | Kondo | G06K 7/0021 | 439/140 |
| 6,125,034 A * | 9/2000 | Bovio | G06F 1/1616 | 361/679.32 |
| 6,149,450 A * | 11/2000 | Gastineau | G06K 7/0021 | 439/325 |
| 6,264,506 B1 * | 7/2001 | Yasufuku | G06K 7/0021 | 439/638 |
| 6,282,097 B1 * | 8/2001 | Minelli | G11B 33/08 | 361/728 |
| 6,457,647 B1 * | 10/2002 | Kurihashi | G06K 7/0047 | 235/441 |
| 6,602,096 B1 * | 8/2003 | Kronestedt | G06K 7/0021 | 439/188 |
| 6,865,086 B2 * | 3/2005 | Gochnour | G06K 19/07739 | 235/492 |
| 7,014,484 B2 * | 3/2006 | Hagiwara | G06F 1/1616 | 439/159 |
| 7,118,421 B2 * | 10/2006 | Kadonaga | G06K 19/07732 | 439/638 |
| 7,125,258 B2 * | 10/2006 | Nakakubo | G06K 19/07741 | 439/328 |
| 7,364,439 B2 * | 4/2008 | Lin | G06K 19/077 | 439/76.1 |
| 7,458,519 B2 * | 12/2008 | Aoki | G06K 19/077 | 235/451 |
| 7,568,928 B2 * | 8/2009 | Hou | H01R 13/2442 | 439/188 |
| 7,699,660 B2 * | 4/2010 | Hubert | G06F 13/409 | 439/630 |
| 8,059,414 B2 * | 11/2011 | Wei | A45C 11/18 | 361/737 |
| 8,102,658 B2 * | 1/2012 | Hiew | G06F 1/1632 | 235/492 |
| 8,150,466 B2 * | 4/2012 | Park | G06K 7/0021 | 361/600 |
| 8,579,640 B2 * | 11/2013 | Ho | H01R 13/6271 | 439/159 |
| 8,711,568 B2 * | 4/2014 | Evens | G06F 1/1626 | 361/728 |
| 8,767,381 B2 * | 7/2014 | Shukla | G06F 1/1658 | 361/679.01 |
| 8,982,567 B2 * | 3/2015 | Bang | G06K 7/0047 | 361/737 |
| 9,001,501 B2 * | 4/2015 | Takasaki | B65D 1/34 | 361/679.01 |
| 9,048,594 B2 * | 6/2015 | Lim | H01R 27/00 | |
| 9,071,018 B2 * | 6/2015 | Suh | H01R 13/62905 | |
| 9,124,042 B2 * | 9/2015 | Matsunaga | H01R 13/74 | |
| 9,136,661 B1 * | 9/2015 | Lin | H01R 31/06 | |
| 9,147,134 B2 * | 9/2015 | Shimada | G06K 13/085 | |
| 9,281,610 B2 * | 3/2016 | Ejiri | H01R 13/5213 | |
| 9,311,571 B2 * | 4/2016 | Lei | G06K 13/0831 | |
| 9,387,647 B2 * | 7/2016 | Wei | H04B 1/3816 | |
| 9,436,896 B2 * | 9/2016 | Hsu | H05K 7/1461 | |
| 9,445,521 B2 * | 9/2016 | Tan | G06K 7/0021 | |
| 9,578,760 B2 * | 2/2017 | Bang | G06K 7/0047 | |
| 9,622,364 B2 * | 4/2017 | Baek | G06F 1/1613 | |
| 9,652,639 B2 * | 5/2017 | Motohashi | G06K 7/0056 | |
| 9,658,641 B2 * | 5/2017 | Stephens | G06F 1/00 | |
| 9,680,243 B2 * | 6/2017 | Shimotsu | H01R 12/7076 | |
| 9,706,676 B2 * | 7/2017 | Moon | H04B 1/3816 | |
| 9,761,971 B2 * | 9/2017 | Motohashi | H01R 12/716 | |
| 9,806,749 B2 * | 10/2017 | Sohn | G06K 13/0831 | |
| 9,832,891 B2 * | 11/2017 | Bang | G06F 1/18 | |
| 2013/0309885 A1 * | 11/2013 | Liu | H01R 13/629 | 439/153 |
| 2014/0002971 A1 * | 1/2014 | Chung | H05K 5/0286 | 361/679.01 |
| 2014/0029211 A1 * | 1/2014 | Gao | H05K 7/0091 | 361/747 |
| 2014/0154926 A1 * | 6/2014 | Cao | G06K 7/04 | 439/634 |
| 2015/0099385 A1 * | 4/2015 | Ikeya | H01R 12/724 | 439/271 |
| 2016/0036143 A1 * | 2/2016 | Motohashi | G06K 13/08 | 439/160 |
| 2016/0359269 A1 * | 12/2016 | Motohashi | G06K 7/0021 | |
| 2017/0179659 A1 * | 6/2017 | Motohashi | H01R 27/00 | |
| 2017/0214178 A1 * | 7/2017 | Motohashi | H01R 12/714 | |

* cited by examiner

CARD HOLDING MEMBER WITH SEALING FEATURE AND CARD CONNECTOR SET

RELATED APPLICATIONS

This application claims priority to Japanese Application No. 2015-249971, filed Dec. 22, 2015, which is incorporated herein by reference in its entirety.

TECHNICAL FIELD

The present disclosure relates to a card holding member and a card connector set.

BACKGROUND ART

Electronic devices such as mobile phones and smartphones include a card connector enabling the use of various types of cards such as SIM (Subscriber Identity Module) cards. A sealed card connector has been proposed which can be used under conditions in which the electronic device is exposed to rain and dust (see, for example, Patent Document 1).

FIG. 18 is a diagram showing a card connector of the prior art.

In this drawing, 811 is a housing for a card connector made of an insulating material. The housing 811 has side wall portions 898 arranged inside and the side wall portions 898 are secured to the case of the electronic device. The housing 811 includes a plurality of terminals 851. When a card holder 961 housing a card is inserted into the card connector, the terminals 851 make contact with the corresponding connecting pads on the card.

An opening 898a is formed in a side wall portion 898 at a location corresponding to an insertion slot for the card connector. The card holder 961 is inserted into the card connector via this opening 898a.

When the card holder 961 has been inserted into the card connector, as shown in the drawing, the rear end surface 961b of the rear frame portion 961a of the card holder 961 is flush with the outer surfaces 898b of the side wall portions 898. A gasket 971 is attached to the outer periphery of the rear frame portion 961a of the card holder 961, and the gasket 971 seals the gap between the inner peripheral surface of the opening 898a and the outer peripheral surface of the rear frame portion 961a to protect the card connector from infiltration by water, dust, and debris.

Patent Document 1: JP 08-335255 A

SUMMARY

However, in a card connector of the prior art, the insertion slot in the housing 811 and the card holder insertion opening formed in the main body of the device are sometimes misaligned due to an error when the housing 811 was mounted in the main body of the device, and it becomes difficult to insert and house a card holder 961 in the housing 811. Even when the card holder 961 can be housed inside the housing 811, the ends of the card holder 961 are inclined relative to the card holder insertion slot in the direction of insertion or the card holder is tilted to one side. As a result, the gasket 971 does not completely seal the space between the outer peripheral surface of the card holder 961 and the inner peripheral surface of the card holder insertion opening, and water and dust penetrate into the main body of the device from outside.

Therefore, the present disclosure provides a highly reliable, well-sealed card holding member and card connector set in which a movable sleeve has been slidably mounted in the card holding member and sealing members have been provided between the card holding member and the movable sleeve and between the outer member and the movable sleeve.

In order to achieve the foregoing, the present disclosure is a card holding member able to be inserted into a card connector via an insertion slot in an outer member and able to hold a card equipped with terminal members, the card holding member comprising a card accommodating portion able to accommodate the card, a connecting base portion connected to the card accommodating portion, a movable sleeve mounted on the connecting base portion slidably in the insertion and ejection directions of the card holding member, a first sealing member forming a seal between the connecting base portion and the movable sleeve, and a second sealing member forming a seal between the insertion slot and the movable sleeve.

In another card holding member, the movable sleeve includes a connecting base portion insertion hole into which the connecting base portion is slidably inserted, the first sealing member sealing the outer peripheral surface of the connecting base portion and the inner peripheral surface of the connecting base portion insertion hole, and the second sealing member sealing the outer peripheral surface of the movable sleeve and the inner peripheral surface of the insertion opening in the outer member.

Another card holding member further comprising a rear end panel connected to the rear end of the connecting base portion, the rear surface of the rear end panel being substantially flush with the outer member when the card holding member has been inserted into the card connector.

In another card holding member, the rear end panel includes an operation insertion hole able to receive an inserted operation assisting member, the movable sleeve being slidably moved in the insertion direction of the card holding member by force received from the operating assisting member.

In another card holding member, the movable sleeve activates the tray ejection mechanism of the card connector when force is received from the operation assisting member.

Also provided is a card connector set comprising a card holding member according to the present disclosure, a card connector into which the card holding member can be inserted, and an outer member to which the card connector is fixed.

In the present disclosure, a movable sleeve has been slidably mounted in the card holding member and sealing members have been provided between the card holding member and the movable sleeve and between the outer member and the movable sleeve. In this way, excellent sealing properties can be obtained and reliability can be improved.

BRIEF DESCRIPTION OF THE DRAWINGS

FIGS. 1A and 1B are a pair of diagrams showing the card connector set in the first embodiment in which a card tray has been inserted into the card connector, in which FIG. 1A is a top view and FIG. 1B is a cross-sectional view from arrows A-A in FIG. 1A.

FIGS. 2A and 2B are a pair of diagrams showing the card connector set in the first embodiment in which a card tray has been inserted into the card connector, in which FIG. 2A is a view from the card connector side and FIG. 2B is a view from the card tray side.

FIGS. 3A and 3B are a pair of perspective views showing the card tray in the first embodiment, in which FIG. 3A is a view from the front and FIG. 3B is a view from the rear.

FIGS. 4A and 4B are a pair of first exploded views showing the card tray in the first embodiment, in which FIG. 4A is a view from the front and FIG. 4B is a view from the rear.

FIGS. 5A and 5B are a pair of second exploded views showing the card tray in the first embodiment, in which FIG. 5A is a view from the front and FIG. 5B is a view from the rear.

FIGS. 6A and 6B are a pair of perspective views of the card connector in the first embodiment, in which FIG. 6A shows the shell detached from the housing and FIG. 6B shows the housing with the shell removed.

FIGS. 7A and 7B are a pair of diagrams showing the first step in the operation performed to eject the card tray from the card connector in the first embodiment, in which FIG. 7A is a top view and FIG. 7B is a cross-sectional view from arrows A-A in FIG. 7A.

FIGS. 8A and 8B are a pair of diagrams showing the second step in the operation performed to eject the card tray from the card connector in the first embodiment, in which FIG. 8A is a top view and FIG. 8B is a cross-sectional view from arrows A-A in FIG. 8A.

FIGS. 9A and 9B are a pair of diagrams showing the third step in the operation performed to eject the card tray from the card connector in the first embodiment, in which FIG. 9A is a top view and FIG. 9B is a cross-sectional view from arrows A-A in FIG. 9A.

FIGS. 10A and 10B are a pair of diagrams showing the fourth step in the operation performed to eject the card tray from the card connector in the first embodiment, in which FIG. 10A is a top view and FIG. 10B is a cross-sectional view from arrows A-A in FIG. 10A.

FIGS. 11A and 11B are a pair of diagrams showing the first step in the operation performed to insert the card tray from the card connector in the first embodiment, in which FIG. 11A is a top view and FIG. 11B is a cross-sectional view from arrows A-A in FIG. 11A.

FIGS. 12A and 12B are a pair of diagrams showing the second step in the operation performed to insert the card tray from the card connector in the first embodiment, in which FIG. 12A is a top view and FIG. 12B is a cross-sectional view from arrows A-A in FIG. 12A.

FIGS. 16A-D are a set of diagrams showing the first step in the operation performed to eject the card tray from the card connector in the second embodiment, in which FIG. 16A is a top view, FIG. 16B is a see-through top view, FIG. 16C is a top view with the shell and outer member removed, and FIG. 16D is a cross-sectional top view.

FIGS. 17A-D is a set of diagrams showing the second step in the operation performed to eject the card tray from the card connector in the second embodiment, in which FIG. 17A is a top view, FIG. 17B is a see-through top view, FIG. 17C is a top view with the shell and outer member removed, and FIG. 17D is a cross-sectional top view.

DETAILED DESCRIPTION OF THE PREFERRED EMBODIMENTS

Figure 1A:
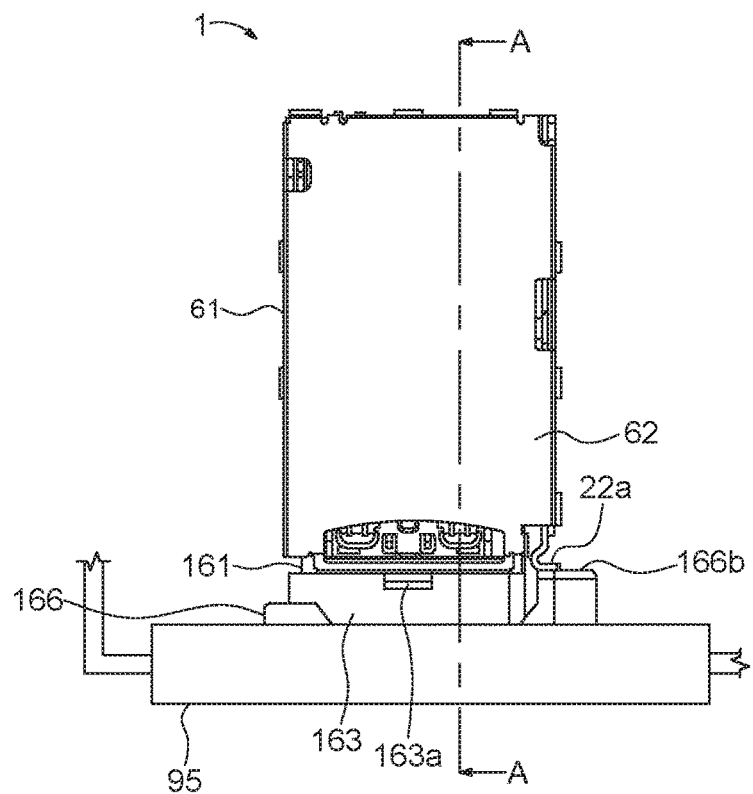

The present disclosure is a more detailed explanation of the present disclosure with reference to the drawings.

In the drawings, 160 is the card tray serving as the card holding member in the present embodiment. It is inserted into a card connector 1 mounted on an outer member 95 of an electronic device (not shown) while housing a card (not shown). In other words, a card is accommodated inside the card accommodating portion 161 of the card tray 160, and is mounted in an electronic device via a card connector 1. The electronic device may be any type of device, including a personal computer, a smartphone, a mobile phone, a communication modem, a tablet, a digital camera, a video camera, a music player, a gaming console, or a car navigation system.

However, when a card connector other than the card connector 1 is mounted in an electronic device, the user may decide not to use the card connector 1. In this case, the user may insert the card tray 160 without a card, that is, an empty card tray 160, into the card connector 1 for storage.

The card can be any type of memory card such as a SIM card, a microSIM card, MMC® multimedia card, SD® secure digital card, miniSD® card, xDPicture® card, Memory Stick®, Memory Stick Duo®, Smart Media®, or TransFlash® memory card. In the explanation of the present embodiment, a microSD® card or a nanoSIM card can be used. The SD Card Association, which is the standard setting body for SD® cards, has set the size of microSD® cards at 15 mm×11 mm×1.0 mm (L×W×D). In accordance with the ETSI TS 102 221 V11.00 card standard, the nanoSIM card has a longitudinal length of 12.3 mm, a width of 8.8 mm, and a thickness of 0.67 mm.

The card accommodating portion 161 has a frame portion 161a shaped so as to face the side surface of the card and surround the side surfaces, and a back panel portion 161b mounted on the frame portion 161a so as to cover one side of the frame portion 161a (the upper side in FIG. 2 through FIG. 5). The back panel portion 161b faces the back surface of the card accommodated inside the card accommodating portion 161 (the side opposite the one on which the electrode pads are exposed). The frame portion 161a and the back panel portion 161b may be components made of any material but the portions surrounded by metal are at least integrally coated with a resin using a molding method such as insert molding or overmolding.

In the present embodiment, the expressions indicating direction, such as upper, lower, left, right, front and rear, which are used to explain the configuration and operation of each portion of the card connector 1 and card tray 160 are relative and not absolute. They depend on the orientation of the card connector 1 and card tray 160, and their constituent components shown in the drawings. When the orientation of the card connector 1 and card tray 160 or their constituent components changes, the interpretation changes in response to the change in orientation.

The space inside the card accommodating portion 161 of the present embodiment is divided into a first space positioned in the front and a second space positioned in the rear. A card can be accommodated in both the first space and the second space. The lower surface of the first space and the second space is a rectangular opening able to expose the electrode pads on the card. The same type of card, for example a nanoSIM card, or different types of cards, for example a nanoSIM card and a microSD® card, can be accommodated in the first space and the second space. A card can be accommodated in either the first space or the second space with the other space remaining empty.

Note that a holding recessed portion 161c is formed on the outer surface of the frame portion 161a for holding and securing the card tray 160 inserted into the card connector 1.

Also, the card tray 160 includes a connecting base portion 163 integrally connected to the rear end of the card accommodating portion 161 (opposite the front end 161f), a movable sleeve 166 mounted slidably on the connecting base portion 163, and a flange panel 164 serving as the rear end panel integrally connected to the rear end of the connecting base portion 163. Note that an operation insertion hole 164c is formed in the flange panel 164 and passes through the flange panel 164 in the thickness direction for receiving the straight, rod-shaped inserted operation assisting member 181.

The movable sleeve 166 is a flat cylindrical tube-shaped member integrally molded from an insulating resin, and includes a connecting base portion insertion hole 167 for receiving the inserted connecting base portion 163 which passes through the movable sleeve 166 in the longitudinal direction, a first seal accommodating recessed portion 167a shape so that the peripheral edges on the rear end of the connecting base portion insertion hole 167 are beveled, a single groove-shaped second seal accommodating recessed portion 168 surrounding the outer periphery of the movable sleeve 166, an operation recessed portion 166c opening near either the left or right end on the rear surface 166a of the movable sleeve 166 (the left end in FIG. 2B), and an operating portion 166b near the one end corresponding to the operation recessed portion 166c on the front surface of the movable sleeve 166. In the example shown in the drawing, the operating portion 166b is formed so that it protrudes forward beyond the other portions on the front surface of the movable sleeve 166. However, it does not have to protrude forward. If necessary, it may be formed so as to be flush with the other portions on the front surface of the movable sleeve 166.

A ring-shaped first sealing member 171 is fitted over the connecting base portion, and is positioned where the connecting base portion 163 and the flange panel 164 are connected. Also, a ring-shaped second sealing member 172 is fitted over the movable sleeve 166 and accommodated inside a second seal accommodating recessed portion 168. The first sealing member 171 and the second sealing member 172 are components made of a resin with elastic properties, such as O-rings. These components may be any type of component with sealing properties.

Figure 2A:
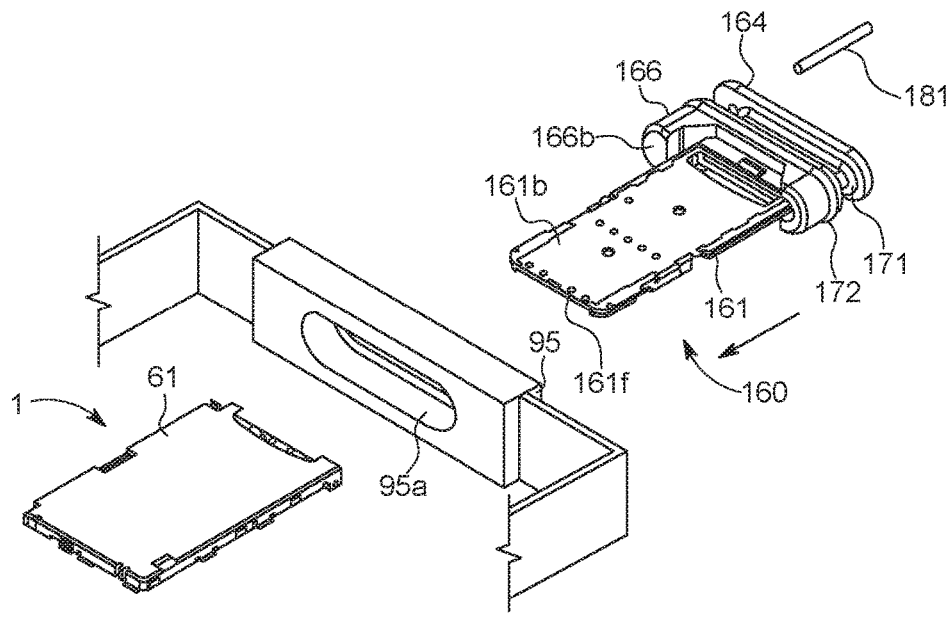
Figure 2B:
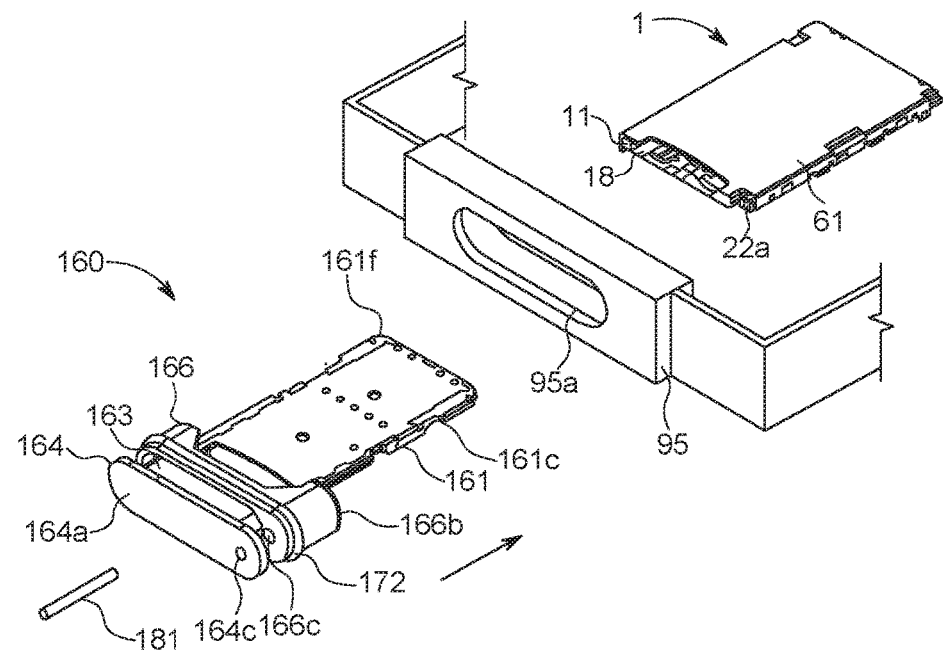
Figure 3A:
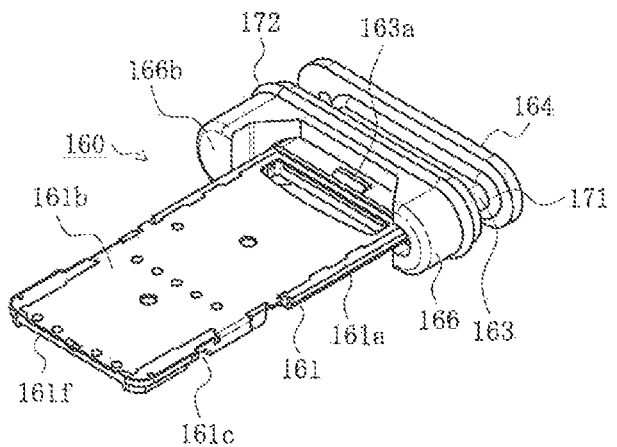
Figure 3B:
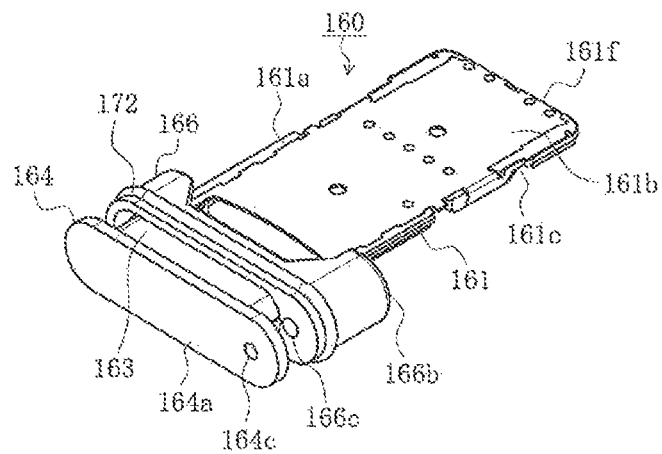
Figure 4A:
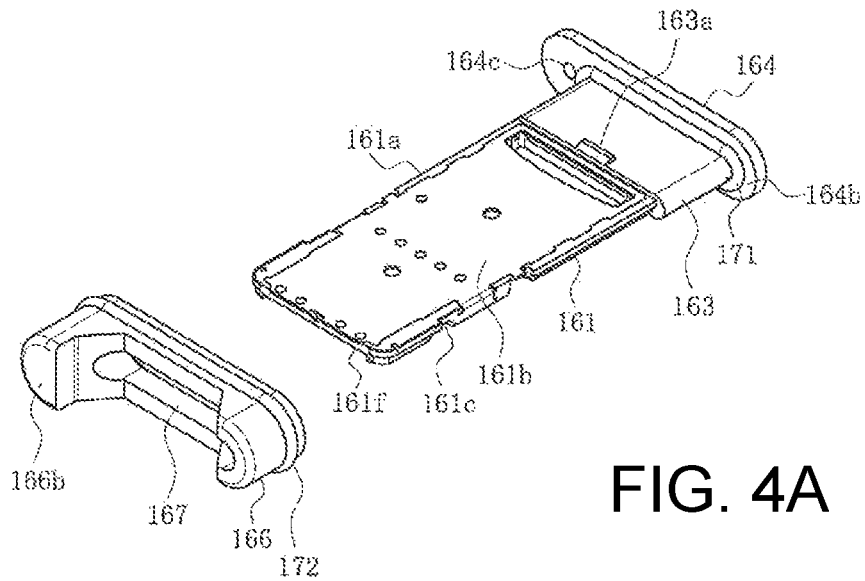
Figure 4B:
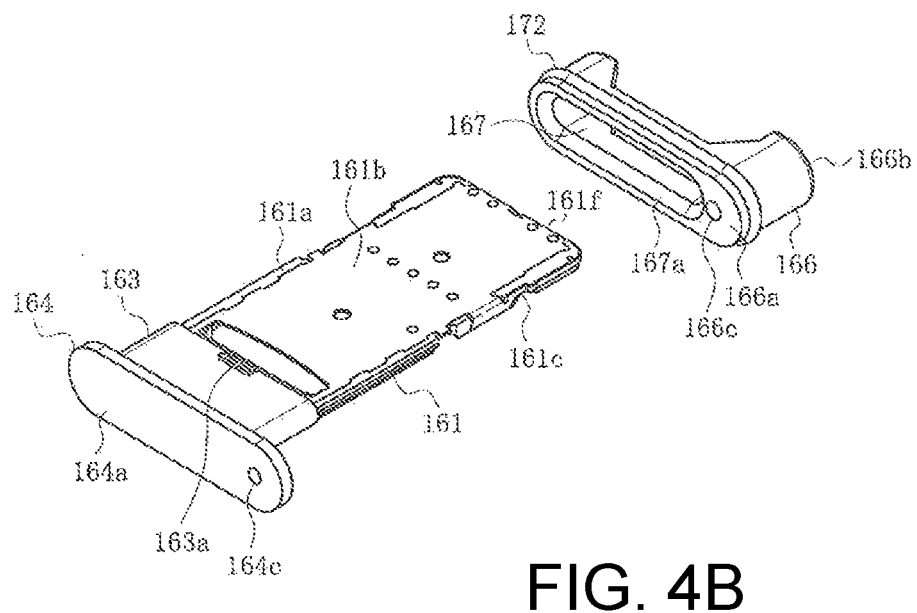
Figure 5A:
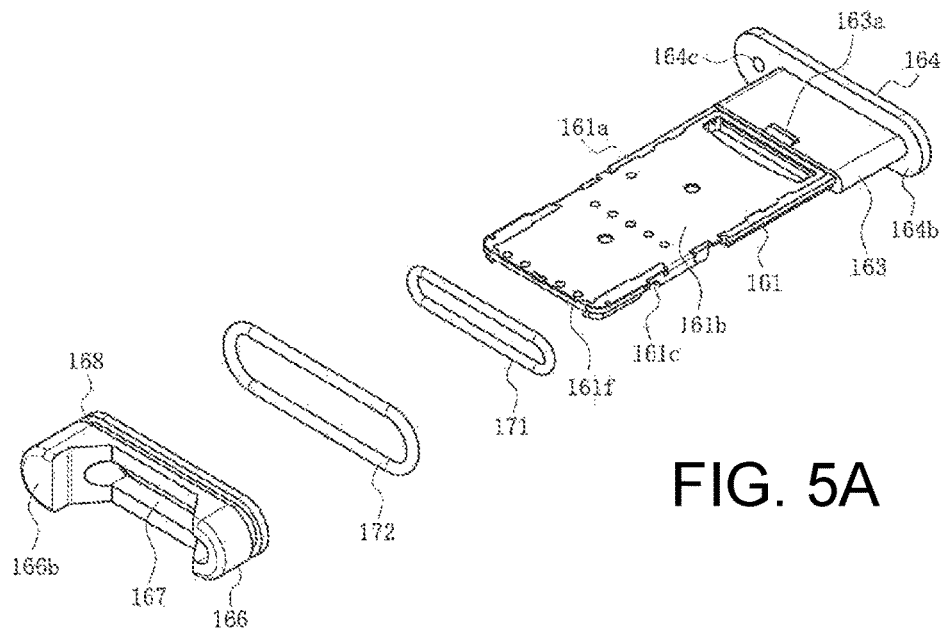
Figure 5B:
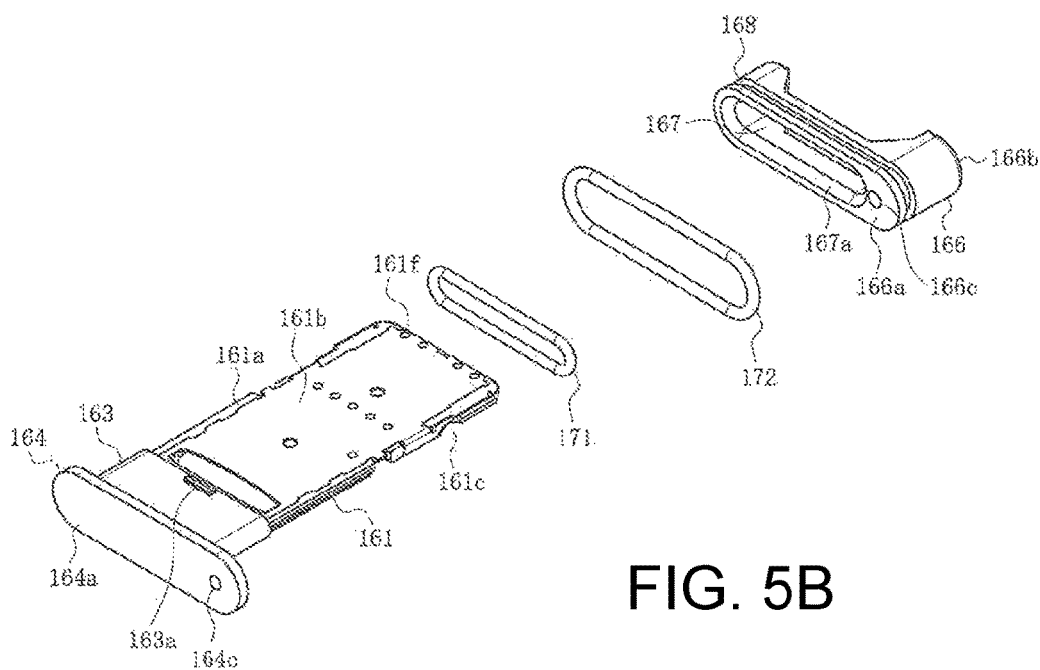

As shown in FIGS. 2A and 2B, the movable sleeve 166 is fitted slidably over the connecting base portion 163. Because a low protruding portion 163a is formed on the surface of the connecting base portion 163, any forward displacement of the movable sleeve 166 fitted on the connecting base portion 163 is checked by the protruding portion 163a. In other words, the movable sleeve 166 can slide longitudinally with respect to the connecting base portion 163 between the front surface 164b of the flange panel 164 and the protruding portion 163a.

The outer member 95 may be a portion of the case of the electronic device to which the card connector 1 is attached or a separate member independent of the card connector 1. The card connector 1 may be attached directly or via a positioning member (not shown) so that the relative position of the card connector 1 does not change. The positioning member may be a circuit board on which the card connector 1 is mounted or an electronic device case to which the card connector 1 has been attached. In the following explanation, the outer member 95 is a portion of the case of the electronic device. Also, the outer surface of the external device 95 functions as an outer surface of the case of the electronic device.

Figure 1B:
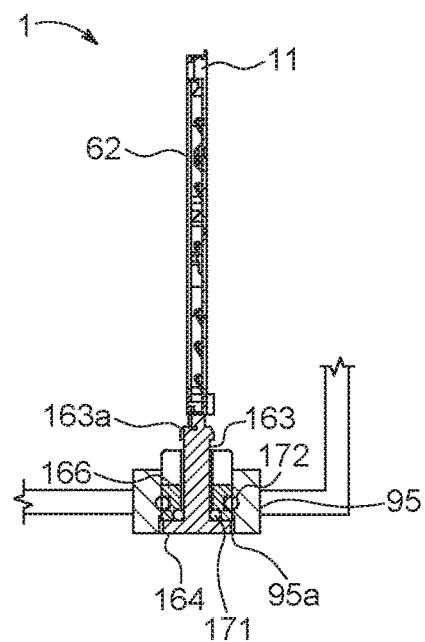

The outer member 95 includes an insertion slot 95a formed so as to pass through the member in the thickness direction. The insertion slot 95a has a shape and dimensions enabling insertion of the card tray 160 and accommodation of the flange panel 164 on the card tray 160. The outer shape and external dimensions of the flange panel 164 are similar to the shape and dimensions of the insertion slot 95a. As shown in FIGS. 1A and 1B, the flange panel 164 is able to fit into the insertion slot 95a.

As shown in FIGS. 1A and 1B, when the card tray 160 has been inserted into the card connector 1, the movable sleeve 166 is inserted into the insertion slot 95a, and the space between the outer peripheral surface of the movable sleeve 166 and the inner peripheral sleeve of the insertion slot 95a is sealed by the second sealing member 172 accommodated in the second seal accommodating recessed portion 168. Also, the rear surface 164a of the flange panel 164 is substantially flush with the outer surface of the outer member 95, the front surface 164b contacts or approaches the rear surface 166a of the movable sleeve 166, and the gap between the front surface 164b of the flange panel 164 and the rear panel 166a of the movable sleeve 166 and the gap between the outer peripheral surface of the connecting base portion 163 and the inner peripheral surface of the connecting base portion insertion hole 167 are sealed by the first sealing member 171 accommodated in the first seal accommodating recessed portion 167a. In this way, the spaces with the outer surface and with the inner surface of the outer member 95 are reliably sealed, and water and dust outside of the outer member 95 serving as the case of the electronic device are kept from penetrating into the case of the electronic device and into the card tray 160 and the card connector 1.

In the present embodiment, the card connector 1 has a housing 11 integrally molded from an insulating material such as a synthetic resin, and a shell 61 or cover member formed integrally by punching and bending a conductive metal sheet which is attached to the upper side of the housing 11. The shell 61 has a substantially rectangular ceiling panel portion 62 and side panel portions 63 erected on the side edges of the ceiling panel portion 62, and covers the housing 11 and at least some of the upper portion of the card tray 160 inserted into the housing 11 and the card connector 1. A plurality of locking openings 63a are formed in the side panel portions 63. When the shell 61 is attached to the top of the housing 11, the locking openings 63a engage locking protrusions 13 formed on the outer surfaces of the side wall portions 11e of the housing 11 to fix the shell 61 to the housing 11. The card connector 1 has a substantially parallelepiped shape, and is mounted on an electronic device. A card tray 160 is inserted into the insertion slot 18 in the rear (below right in FIG. 2B). More specifically, the card tray 160 is inserted into the card insertion space between the housing 11 and the shell 61.

The housing 11 includes primary terminals 51-1, secondary terminals 51-2, tertiary terminals 51-3, and a lower shell 12 integrally formed by stamping and bending a metal panel. This substantially panel-like member is integrally molded using a molding technique such as insert molding or overmolding with an insulating resin which covers and becomes integrated with at least a portion of the periphery of the primary terminals 51-1, secondary terminals 51-2, tertiary terminals 51-3, and the lower shell 12. The lower shell 12 is a frame member for reinforcing the housing 11, and is preferably formed from the same material as the primary terminals 51-1, secondary terminals 51-2 and/or tertiary terminals 51-3, but is electrically insulated from the primary terminals 51-1, the secondary terminals 51-2, and the tertiary terminals 51-3.

The housing 11 also includes a bottom wall portion 11$b$ serving as the substantially rectangular, panel-like terminal holding portion, an inner wall portion 11$a$ thicker than the bottom wall portion 11$b$ which extends in the transverse direction of the housing 11 along the front end portion 11$f$ in the insertion direction (longitudinal direction) of the card tray 160 in the housing 11, and a pair of side wall portions 11$e$ thicker than the bottom wall portion 11$b$ extending in the insertion direction of the housing 11 along both side edges. The lower surfaces of the inner wall portion 11$a$ and the side wall portions 11$e$ are flush with the lower surface of the bottom wall portion 11$b$, and the upper surfaces are above the upper surface of the bottom wall portion 11$b$. The end portion of the housing 11 in the insertion direction of the card tray 160 is referred to as the rear end portion 11$r$.

Here, the bottom wall portion 11$b$ includes a primary terminal holding recessed portion 11$c1$, a secondary terminal holding recessed portion 11$c2$, and a tertiary terminal holding recessed portion 11$c3$ for holding the exposed portions of the primary terminals 51-1, secondary terminals 51-2, and tertiary terminals 51-3. The primary terminal holding recessed portion 11$c1$, secondary terminal holding recessed portion 11$c2$, and tertiary terminal holding recessed portion 11$c3$ are openings which pass through the bottom wall portion 11$b$ in the thickness direction.

The primary terminals 51-1 and tertiary terminals 51-3 are arranged side by side to form rows extending in the longitudinal direction of the housing 11. In the example shown in the drawing, there are two rows of three. At least a portion of each primary terminal 51-1 and tertiary terminal 51-3 is embedded in the bottom wall portion 11$b$, and at least the contact portion 51$c1$, 51$c3$ is exposed inside the primary terminal holding recessed portion 11$c1$ and the tertiary terminal holding recessed portion 11$c3$. Solder tail portions 51$d1$, 51$d3$ to be soldered are also exposed on the bottom surface of the bottom wall portion 11$b$. The contact portions 51$c1$ and 51$c3$ are biased upwards by the spring action of the arm portions of the primary terminals 51-1 and the tertiary terminals 51-3, and come into contact with the corresponding electrode pads exposed on the bottom surface of the nanoSIM cards housed inside the first space and the second space of the frame portion 161 of the card tray 160 held inside the card connector 1. The solder tails 51$d1$ and 51$d3$ are connected electrically by solder to signals lines, contact pads, or terminals formed on the board (not shown).

The secondary terminals 51-2 are arranged in a single row extending in the longitudinal direction of the housing 11. At least a portion of each secondary terminal 51-2 is embedded in the bottom wall portion 11$b$, and at least the contact portion 51$c2$ is exposed inside a secondary terminal holding recessed portion 11$c2$. The solder tail portions 51$d2$ to be soldered are exposed on the bottom surface of the bottom wall portion 11$b$. The contact portions 51$c2$ are biased upwards by the spring action of the arm portions of the secondary terminals 51-2, and come into contact with the corresponding electrode pads on the MicroSD® card housed inside the second space of the frame portion 161 of the card tray 160 held inside the card connector 1. Each solder tail portion 51$d2$ is connected electrically by solder to a signal line, contact pad, or terminal formed on a board.

The number and arrangement of the primary terminals 51-1, the secondary terminals 51-2, and the tertiary terminals 51-3 matches the electrode pads on the cards. The primary terminals 51-1, secondary terminals 51-2, the tertiary terminals 51-3, the primary terminal holding recessed portions 11$c1$, the secondary terminal holding recessed portion 11$c2$, the tertiary terminal holding recessed portions 11$c3$, the contact portions 51$c1$, 51$c2$, 51$c3$, and the solder tail portions 51$d1$, 51$d2$, 51$d3$ may be referred to collectively in the following explanation as the terminals 51, terminal holding recessed portions 11$c$, contact portions 51$c$, and solder tail portions 51$d$.

The lower shell 12 is exposed between the bottom wall portion 11$b$ and the left and right side wall portions 11$e$. A holding spring member 75 is formed on the inner side surface of each side wall portion 11$e$ as a holding spring portion to hold and secure the card tray 160. Each holding spring member 75 is a slender band-shaped member extending in the longitudinal direction, and has a holding protrusion 75$a$ extending inward near the center in the transverse direction of the housing 11. Each holding protrusion 75$a$ engages a holding recessed portion 161$c$ on the frame portion 161$a$, and this holds and secures the frame portion 161$a$ of the card tray 160 inserted into the card connector 1.

A push rod 22 serving as the tray ejection operating member in the tray ejection mechanism for ejecting a card tray 160 inserted in the card connector 1 is mounted slidably to the inside of one of the side wall portions 11$e$. The push rod 22 is a substantially linear rod-shaped or band-shaped member, and a bent operating portion 22$a$ is connected integrally to the rear end portion.

An engaging portion 22$b$ is formed on the front end portion of the push rod 22 to engage the force input portion 21$b$ of the ejection lever 21. The ejection lever 21 is a lever-like member arranged near the inner wall portion 11$a$ which functions as an ejection lever in the ejection mechanism. For this reason, the ejection lever 21 is mounted pivotably on a fulcrum portion 21$c$ formed in the bottom wall portion 11$b$. The end portion of the ejection lever 21 on the other side of the force input portion 21$b$ relative to the fulcrum portion 21$c$ is a force output portion 21$a$ which comes into contact with the front end 161$f$ of the card accommodating portion 161 of the card tray 160 inserted into the card connector 1 to impart force to the card tray 160 in the ejection direction.

The housing 11 includes a movable member 27 and a fixed member 28 for a detection switch used to detect whether the card tray 160 inserted into the card connector 1 has reached a predetermined position inside the card connector 1 (the position at which the card accommodating portion 161 is held by the holding spring members 75 and the contact portions 51$c$ of the terminals 51 are in contact with the corresponding electrode pads on the card when a card is housed inside the card accommodating portion 161). When the card accommodating portion 161 of the card tray 160 has not reached the predetermined position, the movable member 27 and the fixed member 28 are in contact, and the detection switch is electrified or turned ON. However, when the card accommodating portion 161 reaches the predetermined position, the movable member 27 presses against the front end 161$f$ of the card accommodating portion 161, and the movable member 27 is separated from the fixed member 28. Because this de-electrifies or turns the detection switch OFF, it is determined that the card accommodating portion

161 has reached the predetermined position. A detection switch does not have to be installed if not required.

Figure 6A:
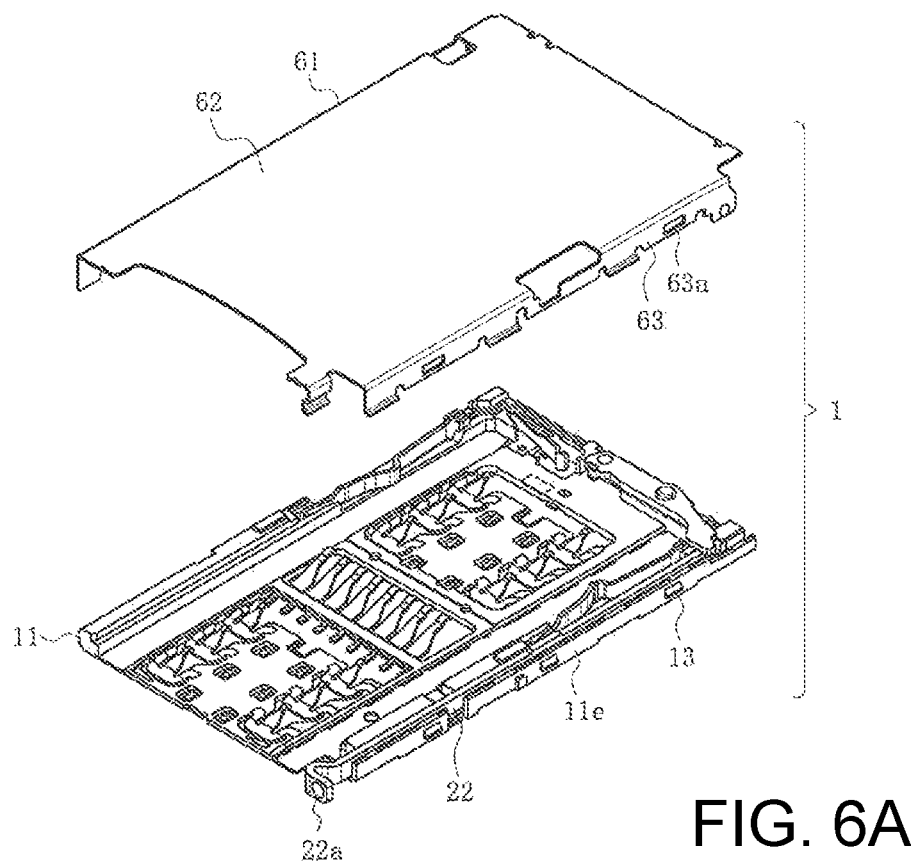
Figure 6B:
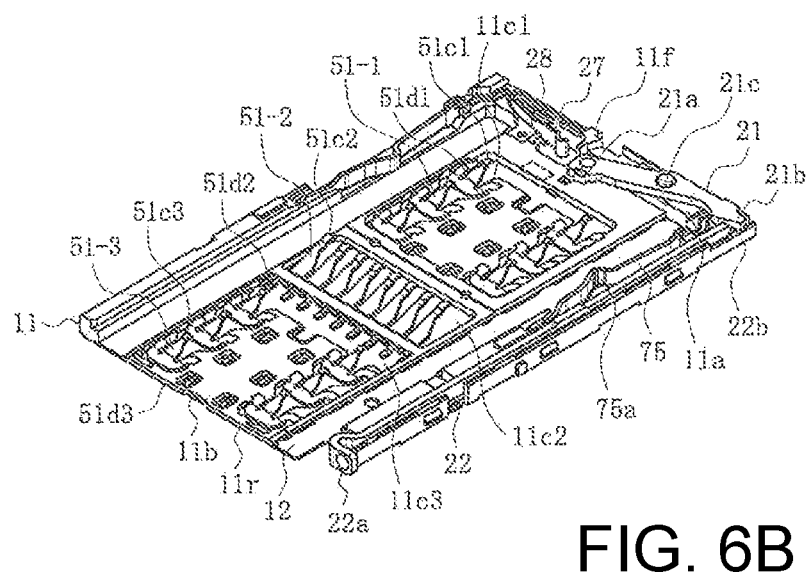

FIG. 6A shows the ejection lever 21 and the push rod 22 when the card tray 160 is at a predetermined position inside the card connector 1, and FIG. 6B shows the ejection lever 21 and the push rod 22 when the card tray 160 has been ejected from the card connector 1.

The following is an explanation of the operations performed to eject a card tray 160 from a card connector 1 with this configuration.

Here, the card tray 160 has been inserted into the card connector 1 as shown in FIGS. 1A and 1B, and the frame portion 161*a* is at a predetermined position inside the card connector 1. For convenience of explanation, the card is not depicted in the card tray 160.

When the card tray 160 has been inserted into the card connector 1, the holding protruding portions 75*a* of the holding spring member 75 in the housing 11 engage the holding recessed portions 161*c* in the frame portion 161*a*. In this way, the frame portion 161*a* is held securely in a predetermined position. The ejection lever 21 and the push rod 22 are in the positions shown in FIG. 6A, and the operating portion 22*a* of the push rod 22 is positioned to the rear of the rear end portion 11*r* of the housing 11. Also, as shown in FIGS. 1A and 1B, the operating portion 166*b* of the movable sleeve 166 protrudes in the forward direction and the front end contacts or approaches the operating portion 22*a*. Also, the position of the operation recessed portion 166*c* of the movable sleeve 166 and the position of the operation insertion hole 164*c* in the flange panel 164 are aligned.

When the card tray 160 is to be ejected from the card connector 1, the user manually grasps the operation assisting member 181 and orients and positions the operation assisting member 181 until the leading end of the operation assisting member 181 is facing forward immediately behind the operation insertion hole 164*c* in the flange panel 164.

Figure 7A:
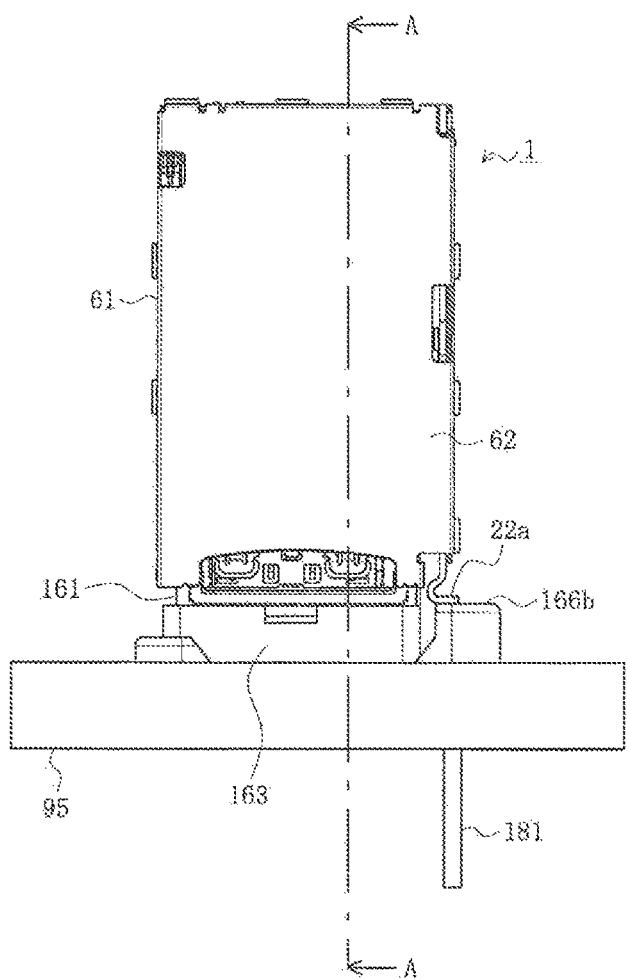
Figure 7B:
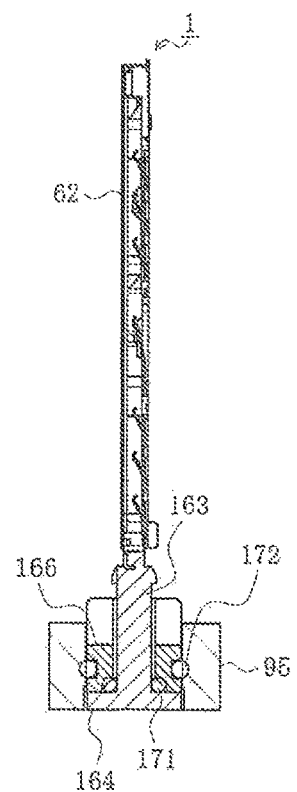

Next, as shown in FIGS. 7A and 7B, the user moves the operation assisting member 181 forward until the leading end has passed through the operation insertion hole 164*c* and reached the operation recessed portion 166*c* in the movable sleeve 166. The operation recessed portion 166*c* is a recessed portion which is closed on the inside. When the user moves the operation assisting member 181 further forward, the movable sleeve 166 slides forward relative to the connecting base portion 163 and the outer member 95, and the operating portion 166*b* moves the operating portion 22*a* forward.

When the user moves the operation assisting member 181 further forward, the movable sleeve 166 and the push rod 22 reach their forwardmost position, and the force output portion 21*a* of the ejection lever 21 is displaced to the position shown in FIG. 6B. In this way, the front end 161*f* is pushed by the force output portion 21*a* of the ejection lever 21, and the card accommodating portion 161 of the card tray 160 is displaced to the rear from a predetermined position and is pushed out from the card connector 1 as shown in FIGS. 8A and 8B.

The holding recessed portions 161*c* formed in the frame portion 161*a* of the card accommodating portion 161 disengage from the holding protruding portions 75*a* of the holding spring portion 75. At this time, the operation assisting member 181 and the operating portion 166*b* are subjected to resistance primarily from the spring action of the elastically deformed holding spring member 75 via the card accommodating portion 161, the ejection lever 21, and the push rod 22, but the resistance is not as great as the manual force exerted by the user so they can move forward against the resistance.

Figure 8A:
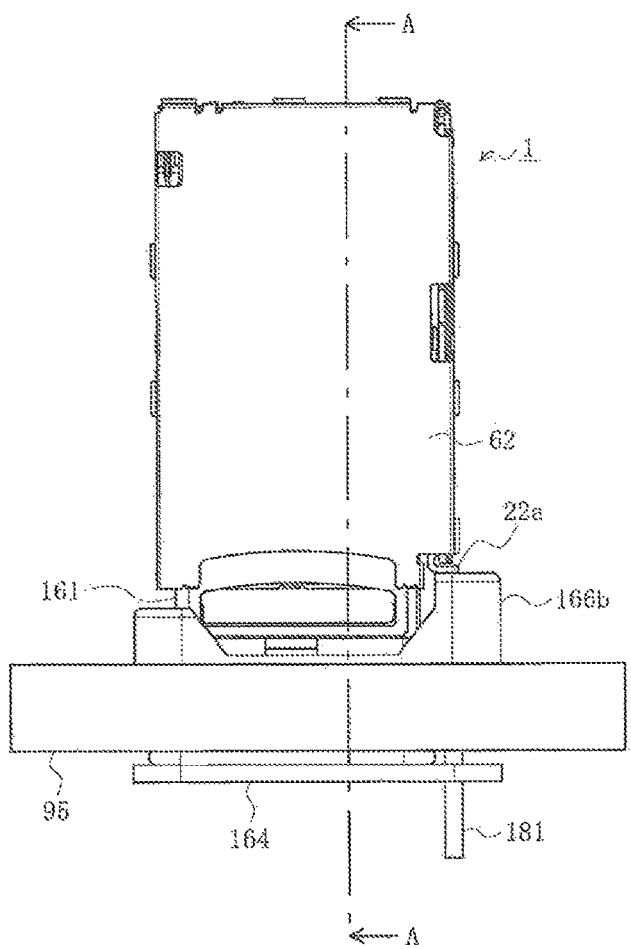
Figure 8B:
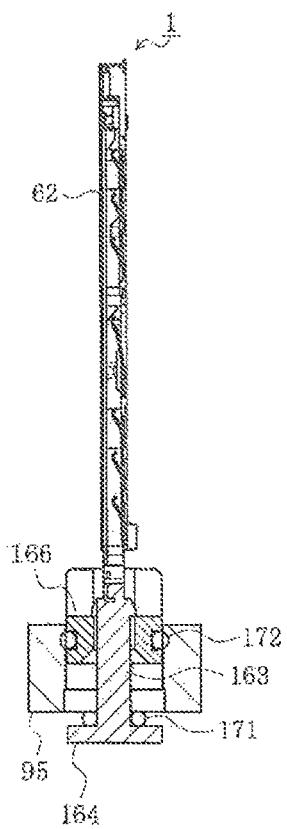

When the card accommodating portion 161 is pushed out of the card connector 1 by the operation of the tray ejection mechanism, as shown in FIGS. 8A and 8B, the connecting base portion 163 connected to the rear end of the card accommodating portion 161 slides to the rear relative to the movable sleeve 166, and the flange panel 164 connected to the rear end of the connecting base portion 163 protrudes from the rear surface of the outer member 95. At this time, the flange panel 164 protrudes from the outer surface of the outer member 95 far enough for the user to manually grasp the flange panel 164.

Figure 9A:
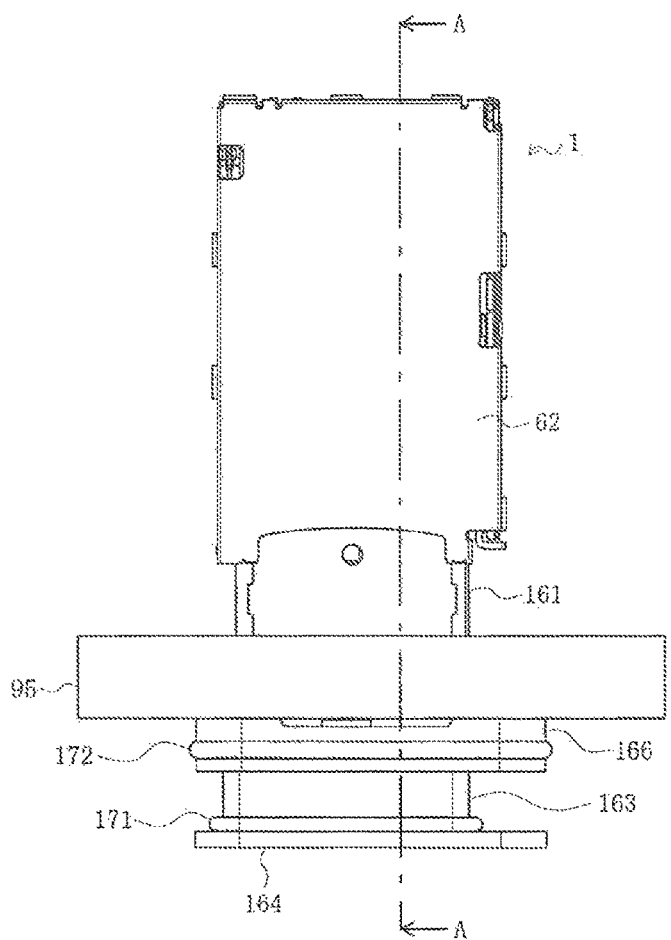
Figure 9B:
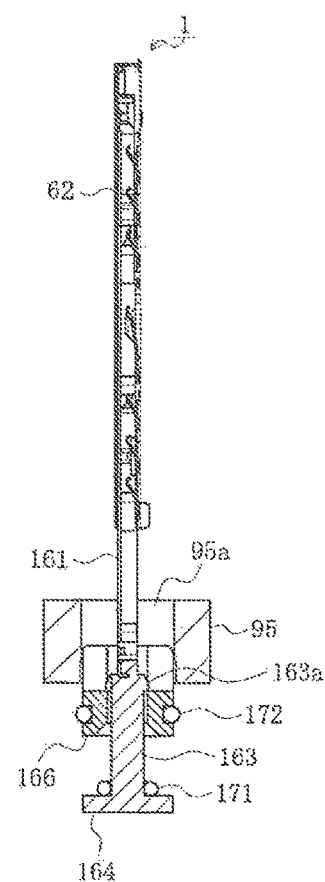

When the user manually grasps the flange panel 164 and pulls it to the rear, the protruding portion 163*a* formed on the surface of the connecting base portion 163 engages the movable sleeve 166 and, as shown in FIGS. 9A and 9B, the movable sleeve 166 moves to the rear along with the connecting base portion 163 and is pulled to the rear of the outside surface of the outer member 95.

Figure 10A:
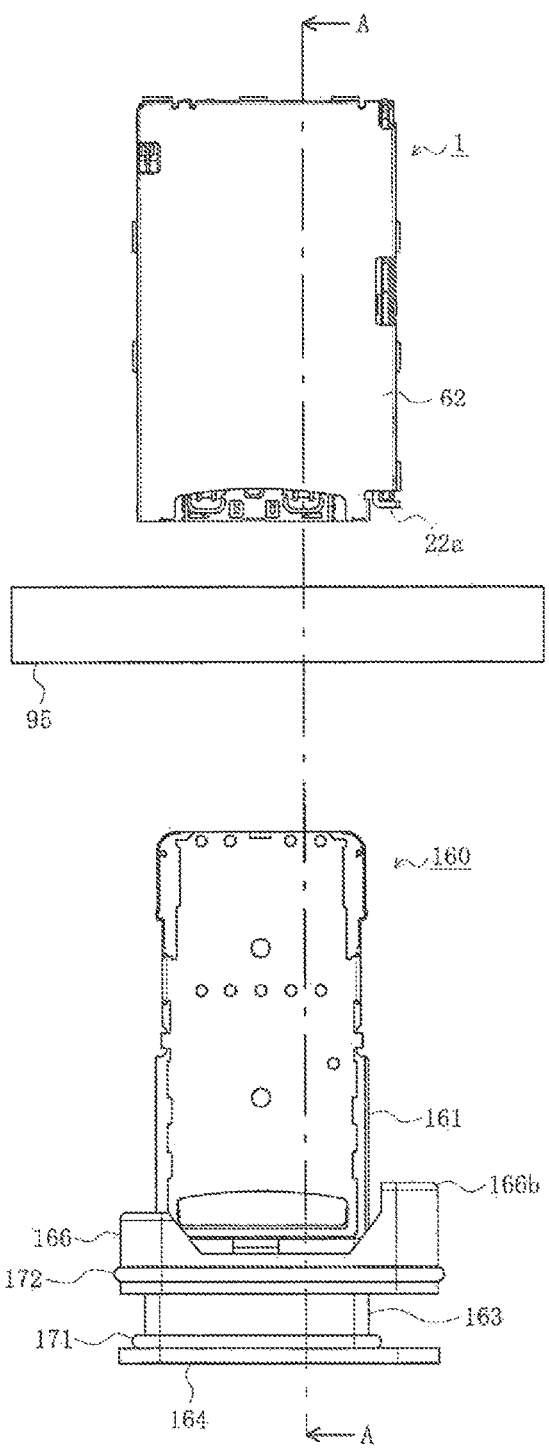
Figure 10B:
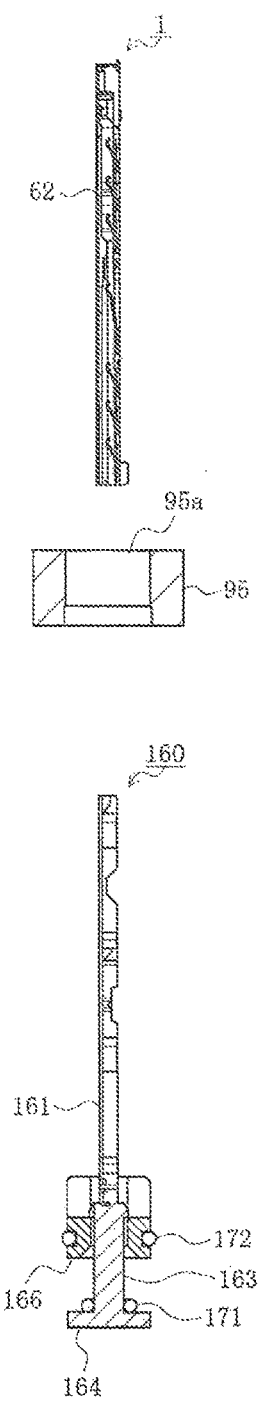

Finally, as shown in FIGS. 10A and 10B, the entire card tray 160 is pulled from the card connector 1 by the user, and pulled outside of the outer member 95 forming a portion of the case for the electronic device.

The following is an explanation of the operations performed to insert a card tray 160 into the card connector 1.

First, the user manually grasps the card tray 160, positions the card tray 160 to the rear of the insertion slot 95*a* in the outer member 95 as shown in FIGS. 10A and 10B, brings the card tray 160 closer to the insertion slot 95*a*, and inserts the tray via the insertion slot 95*a* and the insertion slot 18 in the card connector 1 into the card insertion space formed between the housing 11 and the shell 61. For convenience of explanation, a card is not housed inside the card tray 160.

Figure 11A:
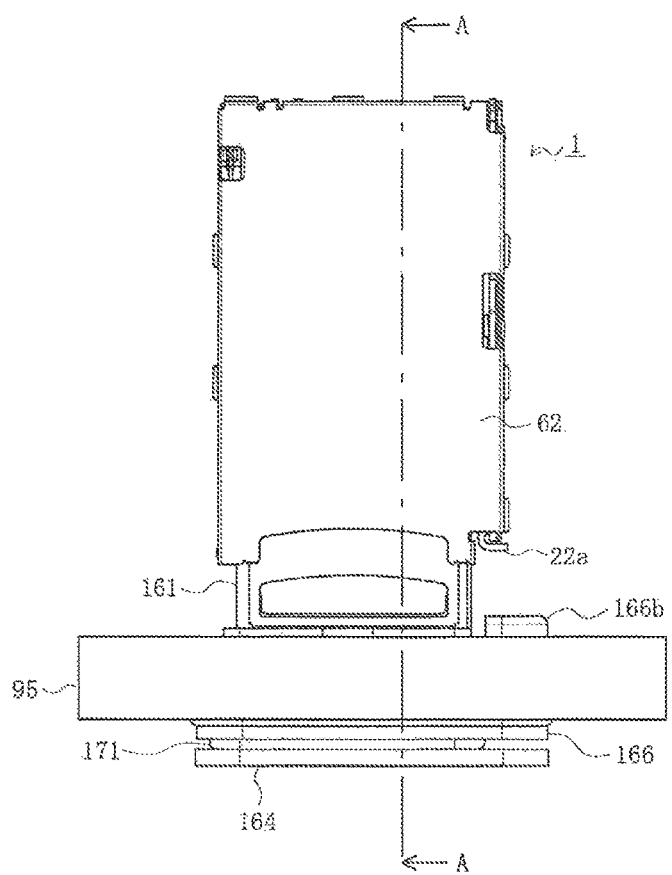
Figure 11B:
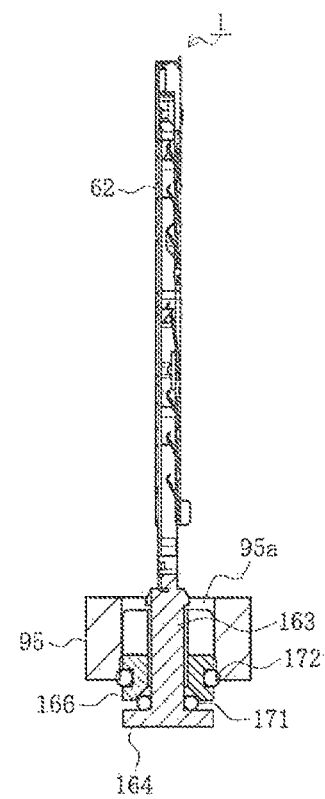

When the card tray 160 is moved further forward, as shown in FIGS. 11A and 11B, the second sealing member 172 fixed around the movable sleeve 166 comes into contact and catches the inner peripheral surface of the insertion slot 95*a*, stopping forward movement of the movable sleeve 166. When the user moves the flange panel 164 further forward manually, the connecting base portion 163 moves forward slidingly relative to the movable sleeve 166, and the card accommodating portion 161 connected to the front end of the connecting base portion 163 moves into the card insertion space of the card connector 1.

Figure 12A:
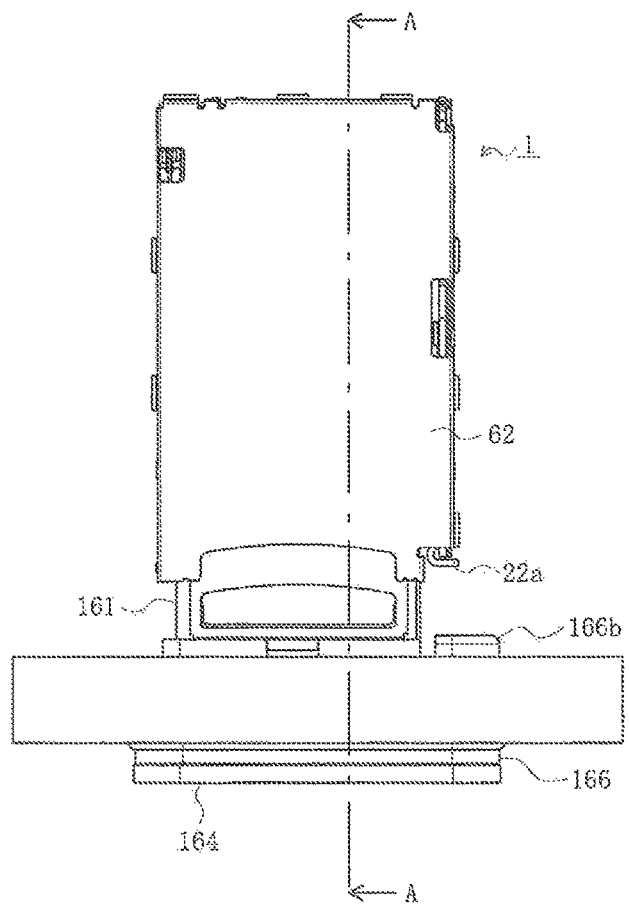
Figure 12B:
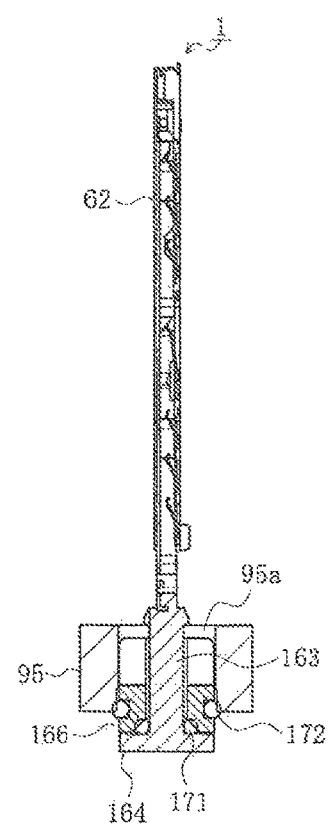
Figure 13:
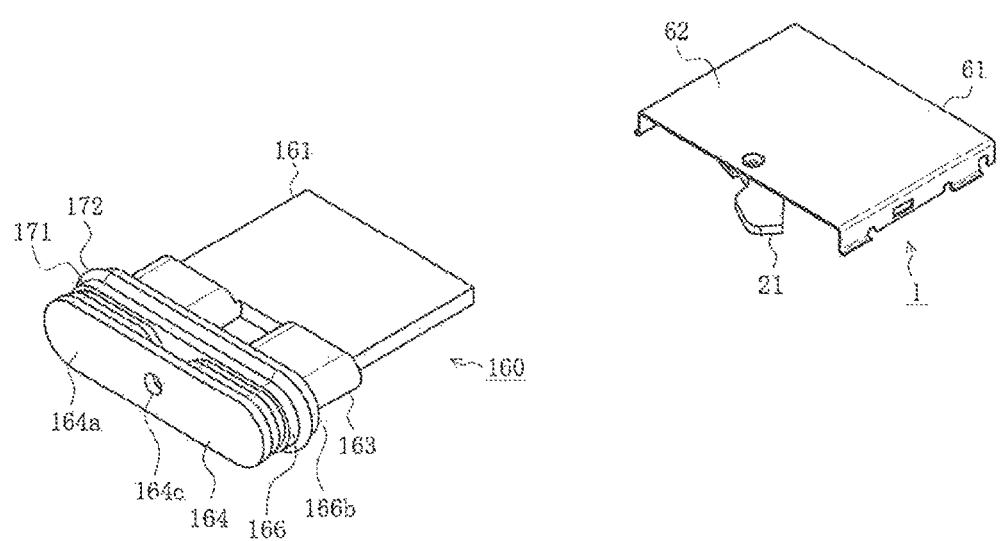
FIG. 13 is a perspective showing the card connector set in the second embodiment in which a card tray has been inserted into the card connector.
Figure 14:
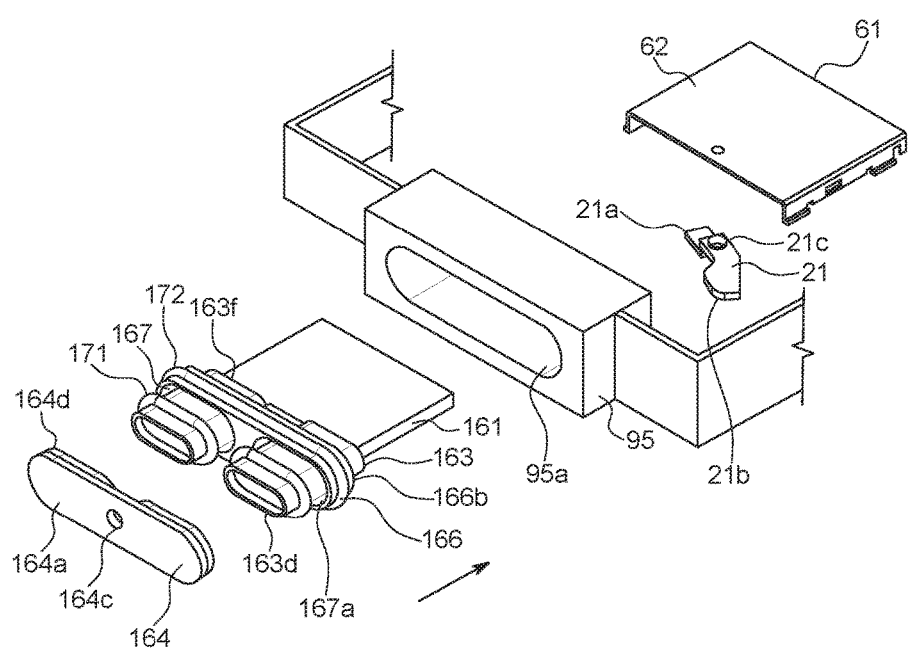
FIG. 14 is a first exploded view of the card tray in the second embodiment.
Figure 15:
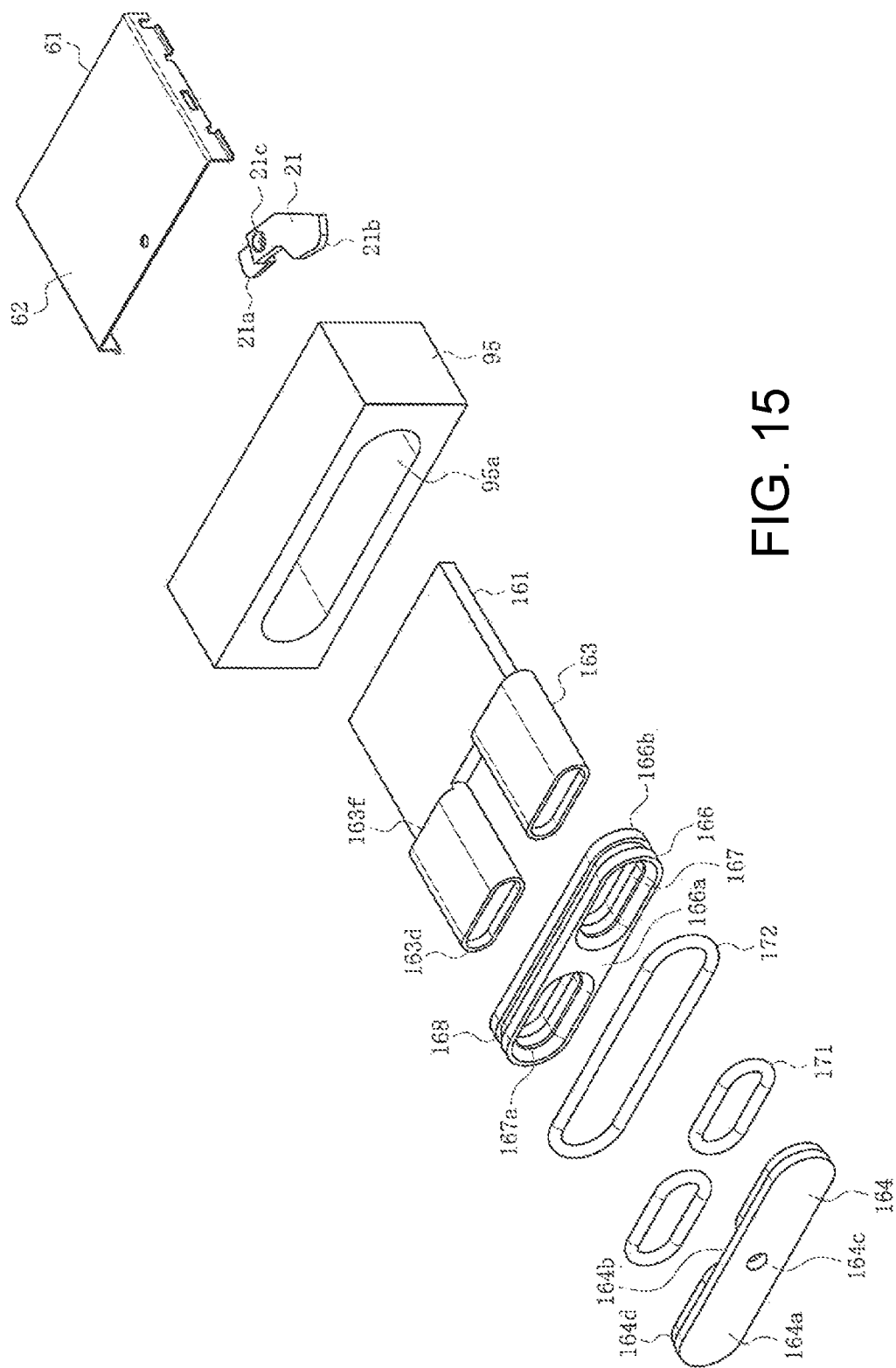
FIG. 15 is a second exploded view of the card tray in the second embodiment.
Figure 16A:
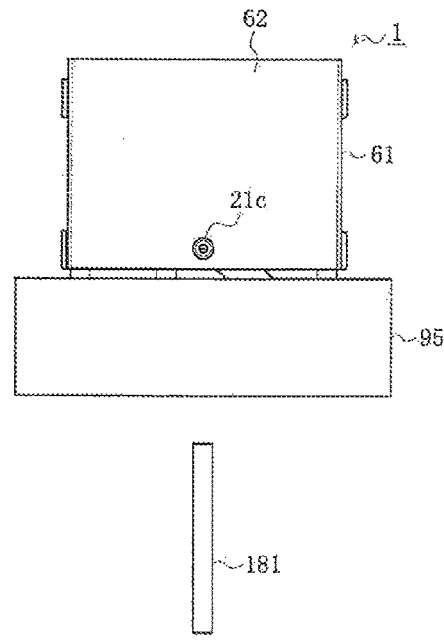
Figure 16C:
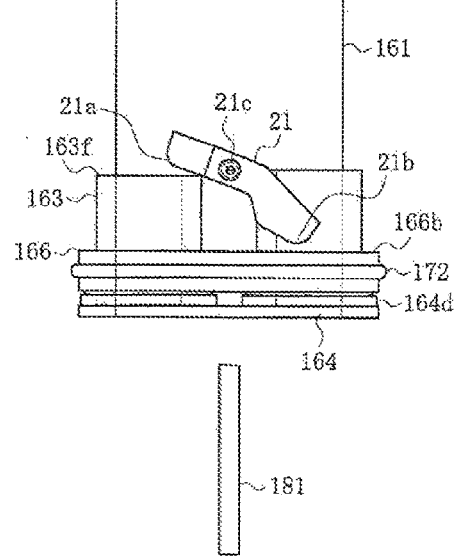
Figure 16B:
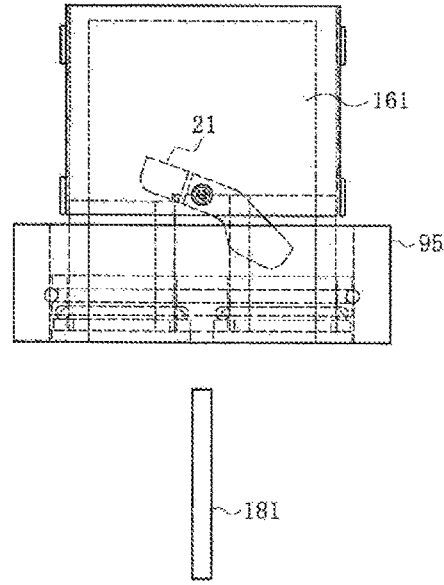
Figure 16D:
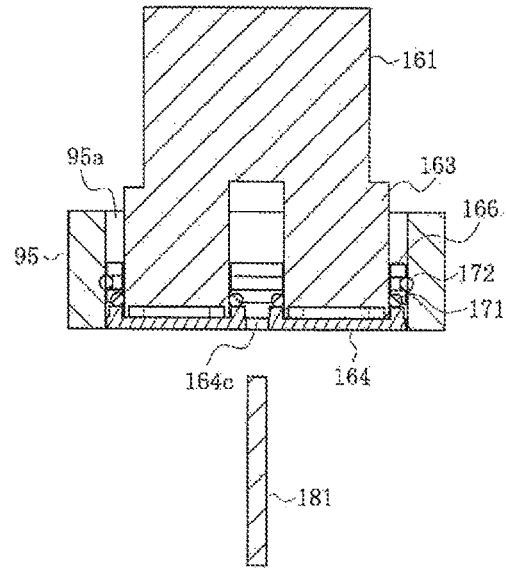
Figure 17A:
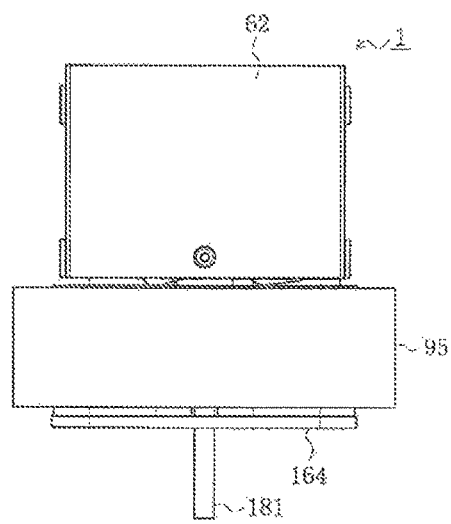
Figure 17C:
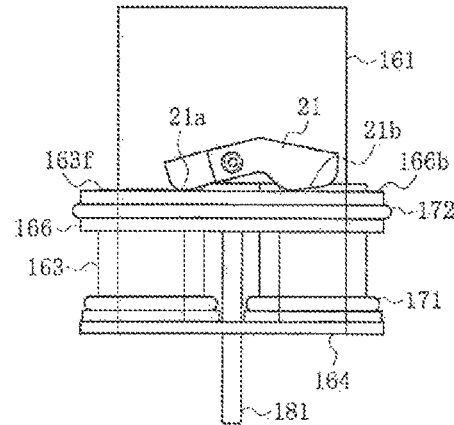
Figure 17B:
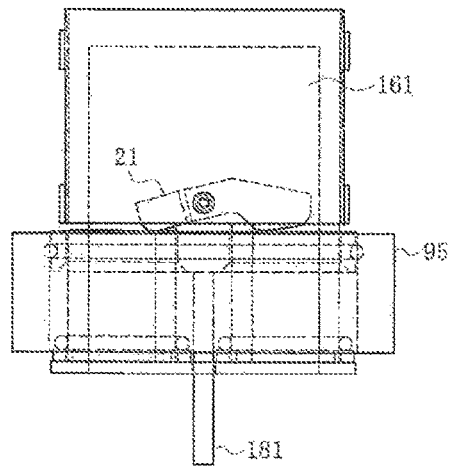
Figure 17D:
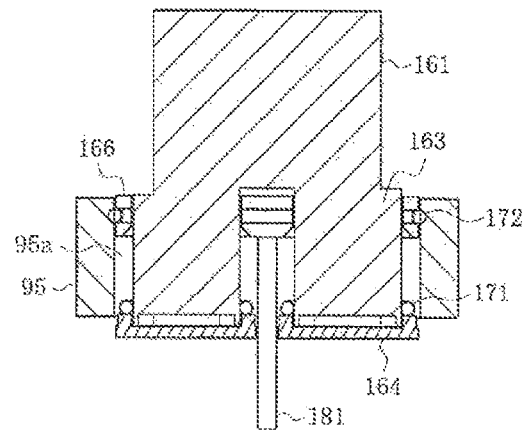
Figure 18:
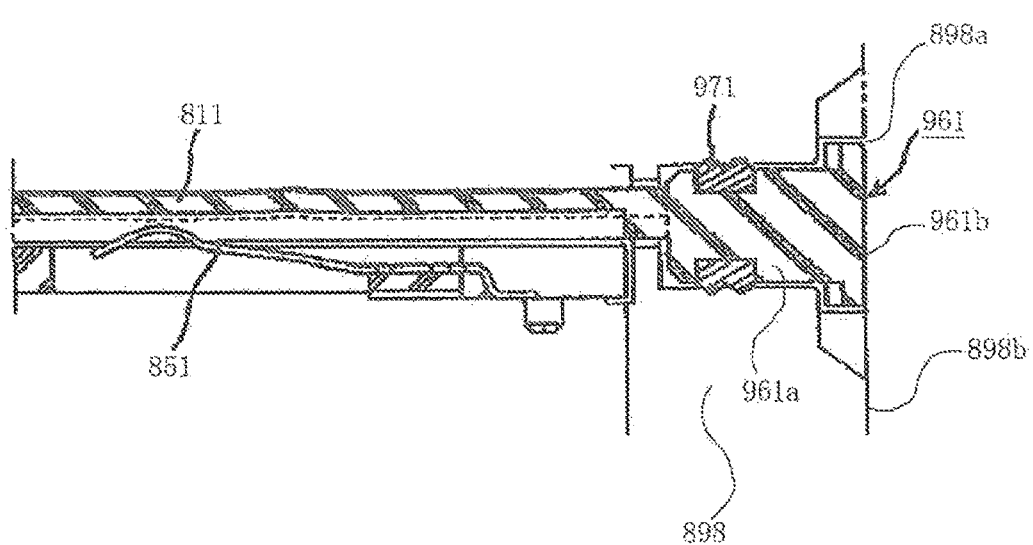
FIG. 18 is a diagram showing a card connector of the prior art.

When the user pushes the flange panel 164 further forward manually, as shown in FIGS. 12A and 12B, the first sealing member 171 fitted over the connecting base portion 163 becomes accommodated inside the first seal accommodating recessed portion 167*a* of the movable sleeve 166, and pressure is applied by the flange panel 164 and the first seal accommodating recessed portion 167*a*. As a result, the force applied manually to the flange panel 164 by the user is transmitted directly to the movable sleeve 166 via the first sealing member 171 when the front surface 164*b* of the flange panel 164 has come into contact with the rear surface 166*a* of the movable sleeve 166.

When the user pushes in the flange panel 164, as shown in FIGS. 1A and 1B, the card tray 160 reaches a predetermined position inside the card connector 1 and the card tray 160 has been inserted completely into the card connector 1.

In the present embodiment, the card tray 160 is able to be inserted into the card connector 1 via the insertion slot 95*a* in the outer member 95 and is able to hold a card equipped with terminal members. The card tray 160 comprises a card accommodating portion 161 able to accommodate the card, a connecting base portion 163 connected to the card accommodating portion 161, a movable sleeve 166 mounted on the connecting base portion 163 slidably in the insertion and ejection directions of the card tray 160, a first sealing member 171 forming a seal between the connecting base portion 163 and the movable sleeve 166, and a second sealing member 172 forming a seal between the insertion slot 95a and the movable sleeve 166.

In this way, even when the card connector 1 and the insertion slot 95a in the outer member 95 are somewhat misaligned, the displacement between the connecting base portion 163 and the movable sleeve 166 can be absorbed by the first sealing member 171 and the displacement between the insertion slot 95a and the movable sleeve 166 can be absorbed by the second sealing member 172. As a result, the card accommodating portion 161 connected to the connecting base portion 163 can be smoothly inserted into and ejected from the card connector 1. More specifically, the first sealing member 171 is interposed between the connecting base portion 163 and the movable sleeve 166, and the second sealing member 172 is interposed between the movable sleeve 166 and the insertion slot 95a. Therefore, a double seal is provided between the connecting base portion 163 of the card tray 160 inserted into the card connector 1 and the insertion slot 95a in the outer member 95. This means there are two sealing members available to absorb significant misalignment between the card connector 1 and the outer member 95, and thus between the connecting base portion 163 and the insertion slot 95a. The two sealing members also reliably keep water and dust from entering via the outer member 95 into the card accommodating portion 161 and the card connector 1. As a result, the device is more reliable.

The movable sleeve 166 includes a connecting base portion insertion hole 167 into which the connecting base portion 163 is slidably inserted, the first sealing member 171 sealing the outer peripheral surface of the connecting base portion 163 and the inner peripheral surface of the connecting base portion insertion hole 167, and the second sealing member 172 sealing the outer peripheral surface of the movable sleeve 166 and the inner peripheral surface of the insertion opening 95a in the outer member 95. In this way, foreign matter is kept from getting beyond the outer member 95 via the space between the outer peripheral surface of the connecting base portion 163 and the inner peripheral surface of the connecting base portion insertion hole 167, and is kept from getting into the card accommodating portion 161 and the card connector 1 via the outer peripheral surface of the movable sleeve 166 and the inner peripheral surface of the insertion opening 95a in the outer member 95.

The card tray 160 further comprises a rear end panel 164 connected to the rear end of the connecting base portion 163, the rear surface 164a of the flange panel 164 being substantially flush with the outer member 95 when the card tray 160 has been inserted into the card connector 1. In this way, the external appearance of the electronic device is improved when the card connector 1 is mounted. Safety is also improved because the user cannot catch a finger in the gap between the rear surface 164a of the flange panel 164 and the outer surface of the external device 95.

The rear end panel 164 includes an operation insertion hole 164c able to receive an inserted operation assisting member 181, the movable sleeve 166 being slidably moved in the insertion direction of the card tray 160 by force received from the operating assisting member 181. Therefore, the movable sleeve 166 can be moved slidably with ease even when the rear surface 164a of the flange panel 164 is flush with the outer surface of the outer member 95. In the example shown in the drawing, the operation insertion hole 164c is formed near either the left or the right end of the flange panel 164. However, it can be formed anywhere on the flange panel 164.

The movable sleeve 166 activates the tray ejection mechanism of the card connector 1 when force is received from the operation assisting member 181. Therefore, because a through-hole does not have to be formed in the movable sleeve 166 for the operation assisting member 181 to pass through, foreign matter is reliably prevented from entering. In the example shown in the drawing, the operating portion 166b of the movable sleeve 166 making contact with the operating portion 22a of the push rod 22 in a portion of the tray ejection mechanism is formed near either the left or the right end of the movable sleeve 166. However, the portion of the tray ejection mechanism activated by the movable sleeve 166 is not limited to this example. It can be formed anywhere in the flange panel 164 depending on the configuration of the tray ejection mechanism.

The following is an explanation of a second embodiment. The structural elements identical to those in the first embodiment are denoted by the same reference numbers and further explanation of these structural elements has been omitted. Further explanation of the operations and effects identical to those in the first embodiment has also been omitted.

The tray ejection mechanism of the card connector 1 in the present disclosure does not include a push rod 22 serving as the tray ejecting member but rather an ejection lever 21 serving as the tray ejecting member. The ejection lever 21 is not mounted on the housing 11 but instead is pivotably mounted on the ceiling panel portion 62 of the shell 61 at the fulcrum portion 21c. For convenience of explanation the housing 11 is not depicted in the present embodiment.

The connecting base portion 163 of the card tray 160 in the present disclosure is split into left and right sections, and these are connected prong-like to the rear end of the card accommodating portion 161. Accordingly, a pair of left and right connecting base portion insertion holes 167 are formed in the movable sleeve 166, and two first sealing members 171 are fitted over the connecting base portion 163. The flange panel 164 is formed separately from the connecting base portion 163, and a pair of mating protruding portions 164d are formed in the front surface 164b of the flange panel 164. The rear end portion 163d of the left and right connecting base portions 163 are fitted into and secured to the mating protruding portions 164d to connect the flange panel 164 to the connecting base portion 163.

In the present embodiment, an operation insertion hole 164c is formed between the left and right mating protruding portions 164d near the center of the flange panel 164. Therefore, the leading end of the operation assisting member 181 inserted into the operation insertion hole 164c makes contact between the left and right connecting base portion insertion holes 167 in the rear surface 166a of the movable sleeve 166. The front surface of the movable sleeve 166 also functions as an operating portion 166b.

Because, as mentioned above, the tray ejection mechanism in the card connector 1 of the present embodiment does not include a push rod 22, the operating member 166b of the movable sleeve 166 contacts the force input portion 21b of the ejection lever 21. Also, the force output portion 21a of the ejection lever 21 does not make contact with the front end 161f of the card accommodating portion 161 of the card tray 160 inserted into the card connector 1 but rather with the front end 163f of the connecting base portion 163.

Therefore, in the present embodiment, when the card tray 160 is ejected from the card connector 1, as shown in FIGS.

16A-16D, the leading end of the operation assisting member 181 is inserted into the operation insertion hole 164c formed near the center of the flange portion 164.

When the operation assisting member 181 is pushed in further, as shown in FIGS. 17A-17D, the movable sleeve 166 slides forward relative to the connecting base portion 163 and the outer member 95, and the operating portion 166b pushes forward the force input portion 21b of the ejection lever 21. Then, the front end 163f of the connecting base portion 163 is pushed into the force output portion 21a of the ejection lever 21, and the flange panel 164 connected to the rear end of the connecting base portion 163 protrudes to the rear of the outer surface of the outer member 95.

Because the rest of the structural elements in the card connector 1 and the card tray 160 in the present embodiment are identical to those in the first embodiment, further explanation has been omitted. Because the operations performed to eject the card tray 160 from the card connector 1 and the operations performed to insert the card tray 160 into the card connector 1 in the present embodiment are identical to those in the first embodiment, further explanation has been omitted.

In the disclosure of the present specification, characteristics related to specific preferred embodiments were described. A person of ordinary skill in the art could naturally devise other embodiments, modifications, and variations with reference to the disclosure of the present specification without departing from the spirit and scope of the appended claims.

The present disclosure can be applied to a card holding member and to a card connector set.

The invention claimed is:

1. A card holding member able to be inserted into a card connector via an insertion slot in an outer member and able to hold a card equipped with terminal members, the card holding member comprising:
   a card accommodating portion able to accommodate the card;
   a connecting base portion connected to the card accommodating portion;
   a movable sleeve mounted on the connecting base portion slidably in the insertion and ejection directions of the card holding member;
   a first sealing member forming a seal between the connecting base portion and the movable sleeve; and
   a second sealing member forming a seal between the insertion slot and the movable sleeve.

2. The card holding member according to claim 1, wherein the movable sleeve includes a connecting base portion insertion hole into which the connecting base portion is slidably inserted, the first sealing member sealing the outer peripheral surface of the connecting base portion and the inner peripheral surface of the connecting base portion insertion hole, and the second sealing member sealing the outer peripheral surface of the movable sleeve and the inner peripheral surface of the insertion opening in the outer member.

3. The card holding member according to claim 1, further comprising a rear end panel connected to the rear end of the connecting base portion, the rear surface of the rear end panel being substantially flush with the outer member when the card holding member has been inserted into the card connector.

4. The card holding member according to claim 3, wherein the rear end panel includes an operation insertion hole able to receive an inserted operation assisting member, the movable sleeve being slidably moved in the insertion direction of the card holding member by force received from the operating assisting member.

5. The card holding member according to claim 4, wherein the movable sleeve activates the tray ejection mechanism of the card connector when force is received from the operation assisting member.

6. A card connector set comprising a card holding member according to claim 1, a card connector into which the card holding member can be inserted, and an outer member to which the card connector is fixed.

* * * * *